US010790722B2

(12) United States Patent
Greunke

(10) Patent No.: US 10,790,722 B2
(45) Date of Patent: Sep. 29, 2020

(54) INTEGRATED MECHANICAL BRAKE FOR ELECTRIC MOTOR

(71) Applicant: MILWAUKEE ELECTRIC TOOL CORPORATION, Brookfield, WI (US)

(72) Inventor: Kyle Greunke, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/567,040

(22) Filed: Sep. 11, 2019

(65) Prior Publication Data
US 2020/0127531 A1 Apr. 23, 2020

Related U.S. Application Data

(60) Provisional application No. 62/749,440, filed on Oct. 23, 2018.

(51) Int. Cl.
H02K 7/106 (2006.01)
H02K 7/102 (2006.01)
B66B 5/18 (2006.01)

(52) U.S. Cl.
CPC ............. H02K 7/1023 (2013.01); B66B 5/18 (2013.01)

(58) Field of Classification Search
CPC .. H02K 7/106; H02K 5/20; H02P 3/02; H02P 3/06
See application file for complete search history.

(56) References Cited

U.S. PATENT DOCUMENTS

| 2,489,365 | A |   | 11/1949 | Broussouse |
|-----------|---|---|---------|------------|
| 3,474,273 | A |   | 10/1969 | Duurkoop |
| 3,608,661 | A | * | 9/1971  | Arnot ................... B60K 7/0007 |
|           |   |   |         | 477/21 |
| 3,659,170 | A |   | 4/1972  | Burkett et al. |
| 3,665,231 | A |   | 5/1972  | Wendler |

(Continued)

FOREIGN PATENT DOCUMENTS

| CN | 200953510 Y | 9/2007 |
| CN | 104967363 B | 10/2015 |

(Continued)

OTHER PUBLICATIONS

International Search Report and Written Opinion for Application No. PCT/US2019/050509 dated Jan. 6, 2020 (7 pages).

*Primary Examiner* — Rina I Duda
(74) *Attorney, Agent, or Firm* — Michael Best & Friedrich LLP

(57) ABSTRACT

A braking mechanism for an electric motor includes an electromagnet configured to be selectively energized in response to a control signal. The braking mechanism also includes a first braking member coupled for co-rotation with a motor shaft of the electric motor, the first braking member being configured to selectively translate axially relative to the motor shaft between a first position and a second position. The braking mechanism also includes a second braking member located between the first braking member and the electromagnet and rotationally fixed relative to the first braking member. When the electromagnet is energized, the electromagnet causes the first braking member to translate from the first position to the second position at which the first braking member engages the second braking member to brake the electric motor.

20 Claims, 7 Drawing Sheets

(56) References Cited

U.S. PATENT DOCUMENTS

| | | | |
|---|---|---|---|
| 4,811,820 A | | 3/1989 | Rossi |
| 5,261,646 A | * | 11/1993 | Telford .................... B66D 5/08 254/375 |
| 6,781,264 B1 | * | 8/2004 | Conrad .................... H02K 9/06 310/77 |
| 7,100,747 B1 | * | 9/2006 | Conrad ................ H02K 7/1025 188/162 |
| 9,243,674 B2 | * | 1/2016 | Esenwein .......... B23Q 11/0092 |
| 2008/0314701 A1 | | 12/2008 | Bogelein et al. |
| 2008/0315728 A1 | | 12/2008 | Liu et al. |
| 2017/0066624 A1 | | 3/2017 | Stolt et al. |
| 2017/0166061 A1 | | 6/2017 | Isono et al. |
| 2017/0244301 A1 | | 8/2017 | Isono et al. |

FOREIGN PATENT DOCUMENTS

| | | |
|---|---|---|
| CN | 207669044 U | 7/2018 |
| DE | 3028580 A1 | 2/1982 |
| JP | 2002029625 A | 1/2002 |
| KR | 1020170028246 A | 3/2017 |
| WO | 2008141998 A1 | 11/2008 |

\* cited by examiner

INTEGRATED MECHANICAL BRAKE FOR ELECTRIC MOTOR

CROSS-REFERENCE TO RELATED APPLICATIONS

This application claims priority to co-pending U.S. Provisional Patent Application No. 62/749,440 filed on Oct. 23, 2018, the entire content of which is incorporated herein by reference.

FIELD OF THE INVENTION

The present invention relates to power tools, and more particularly to power tools including electric motors having integrated mechanical brake mechanisms.

BACKGROUND OF THE INVENTION

Power tools can include an electric motor having a brake mechanism to selectively slow or stop an output shaft of the electric motor. The brake mechanism may include a braking pad that rotates with the output shaft of the motor and a brake member that can frictionally engage the braking pad.

SUMMARY OF THE INVENTION

The present invention provides, in one aspect, a braking mechanism for an electric motor. The braking mechanism includes an electromagnet configured to be selectively energized in response to a control signal. The braking mechanism also includes a first braking member coupled for co-rotation with a motor shaft of the electric motor, the first braking member being configured to selectively translate axially relative to the motor shaft between a first position and a second position. The braking mechanism also includes a second braking member located between the first braking member and the electromagnet and rotationally fixed relative to the first braking member. When the electromagnet is energized, the electromagnet causes the first braking member to translate from the first position to the second position at which the first braking member engages the second braking member to brake the electric motor.

The present invention provides, in another aspect, a braking mechanism for an electric motor. The braking mechanism includes a first braking member coupled for co-rotation with a motor shaft of the electric motor, the first braking member being configured to selectively translate axially relative to the motor between a first position and a second position. The braking mechanism further includes a fan coupled for co-rotation with the first braking member, the fan being configured to selectively translate axially together with the first braking member and relative to the motor shaft. The braking mechanism also includes a second braking member rotationally fixed relative to the first braking member and to the fan. The first braking member does not engage the second braking member in the first position, and the first braking member engages the second braking member in the second position to brake the electric motor.

The present invention provides, in yet another aspect, a braking mechanism for an electric motor. The braking mechanism includes a first braking member coupled for co-rotation with a motor shaft of the electric motor, the first braking member including a frusto-conical first braking surface that defines an acute angle relative to a motor axis defined by the motor shaft. The braking mechanism further includes a second braking member rotationally fixed relative to the first braking member, the second braking member including a frusto-conical second braking surface. The frusto-conical first braking surface selectively engages the frusto-conical second braking surface to brake the electric motor.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
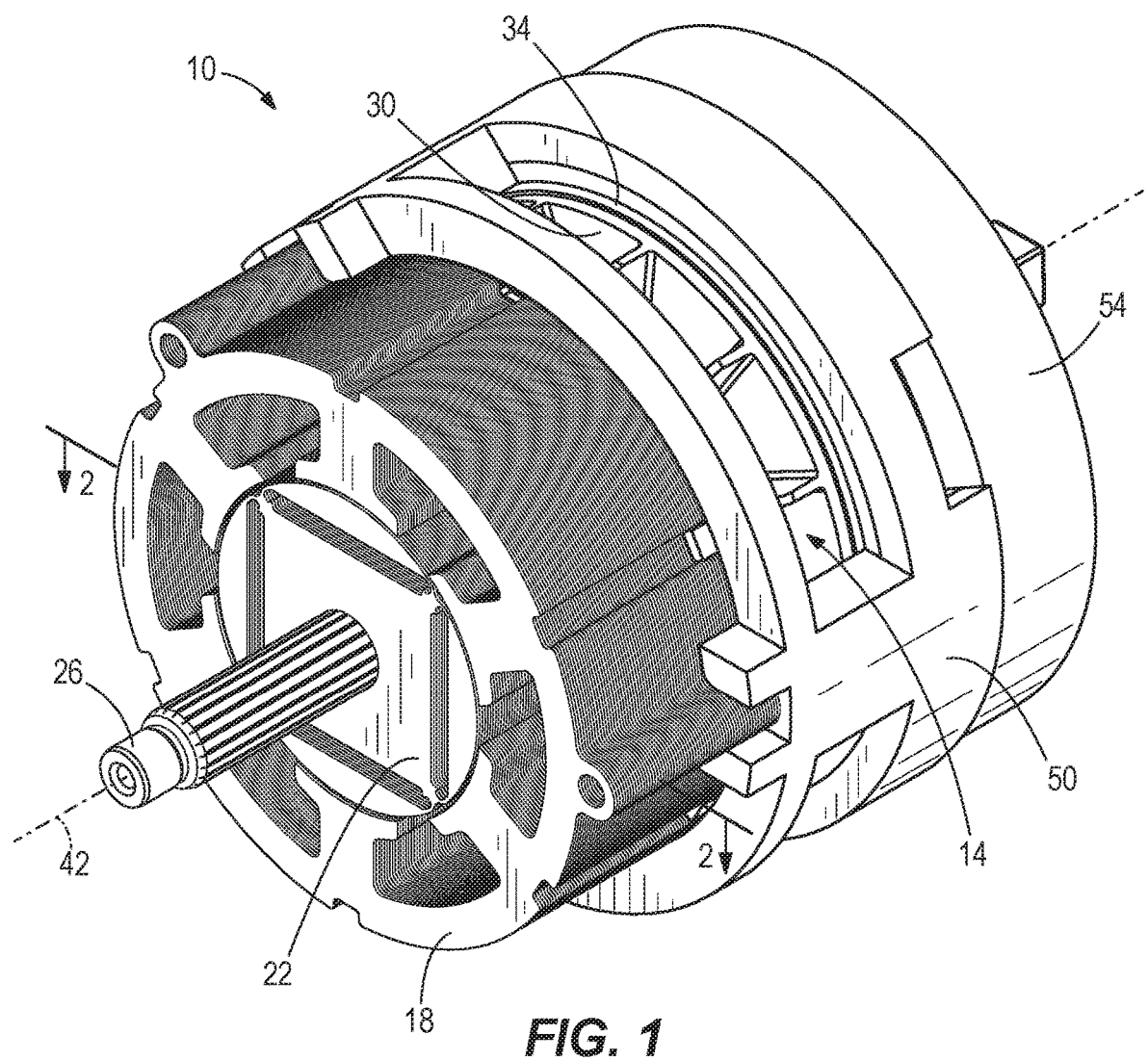
FIG. 1 is a perspective view of an electric motor including a braking mechanism.
Figure 2:
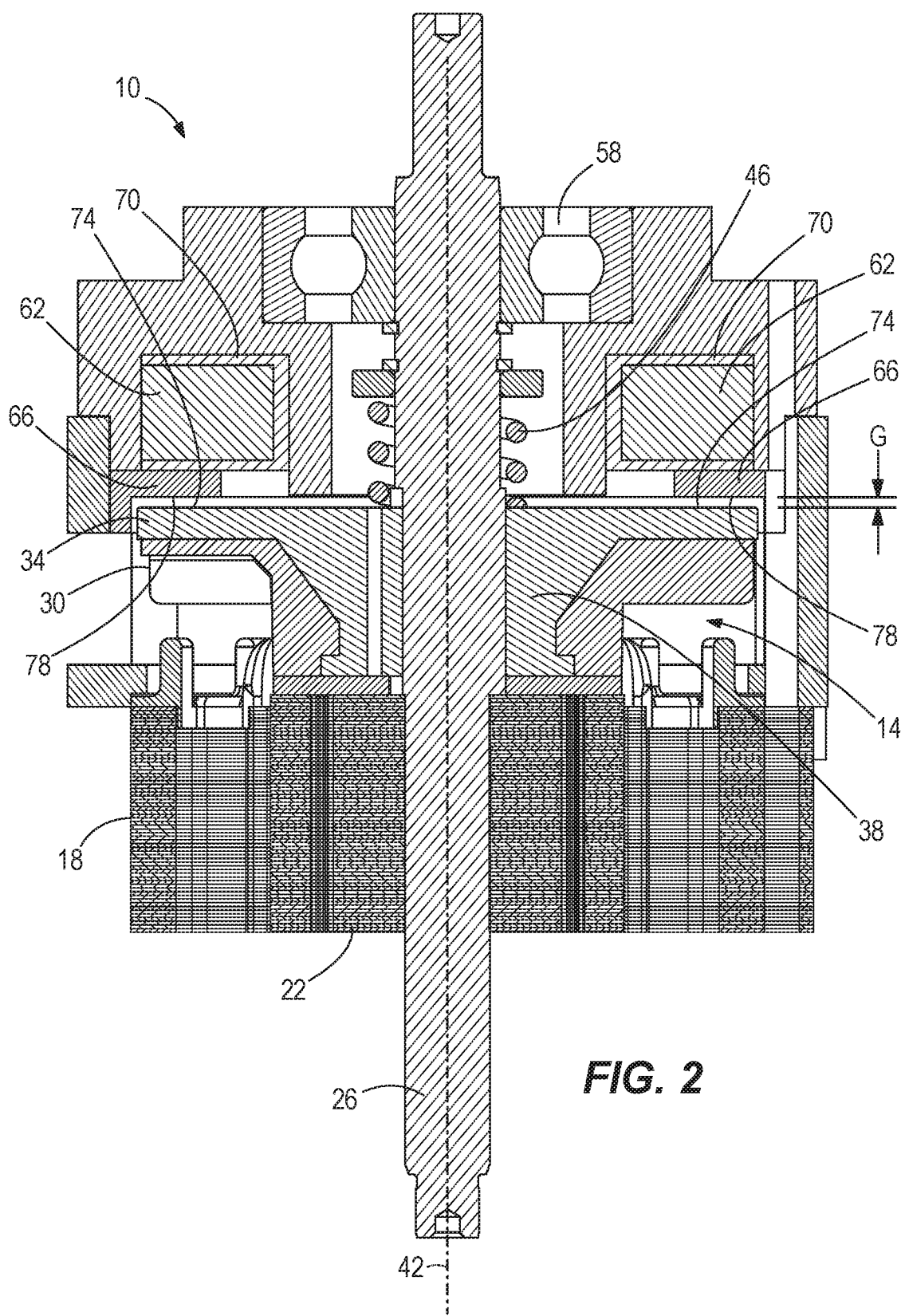
FIG. 2 is a cross-sectional view of the electric motor of FIG. 1 illustrating a first braking member of the braking mechanism in a release position.

FIGS. 1 and 2 illustrate an electric motor 10 including an integrated braking mechanism 14 for quickly stopping rotation of the motor 10 in response to the motor 10 being deactivated. The motor 10 may be used in various different power tools (e.g., rotary hammers, pipe threaders, cutting tools, etc.) in which it may be desirable to stop the output of the power tools more quickly compared to an electric motor without the integrated braking mechanism 14.

The electric motor 10 is configured as a brushless DC motor. In some embodiments, the motor 10 may receive power from an on-board power source (e.g., a battery, not shown). The battery may include any of a number of different nominal voltages (e.g., 12V, 18V, etc.), and may be configured having any of a number of different chemistries (e.g., lithium-ion, nickel-cadmium, etc.). Alternatively, the motor 10 may be powered by a remote power source (e.g., a household electrical outlet) through a power cord. The motor 10 includes a substantially cylindrical stator 18 operable to produce a magnetic field. A rotor 22 is rotatably supported by a motor shaft 26 and configured to rotate together with the motor shaft 26 and relative to the stator 18.

Figure 3:
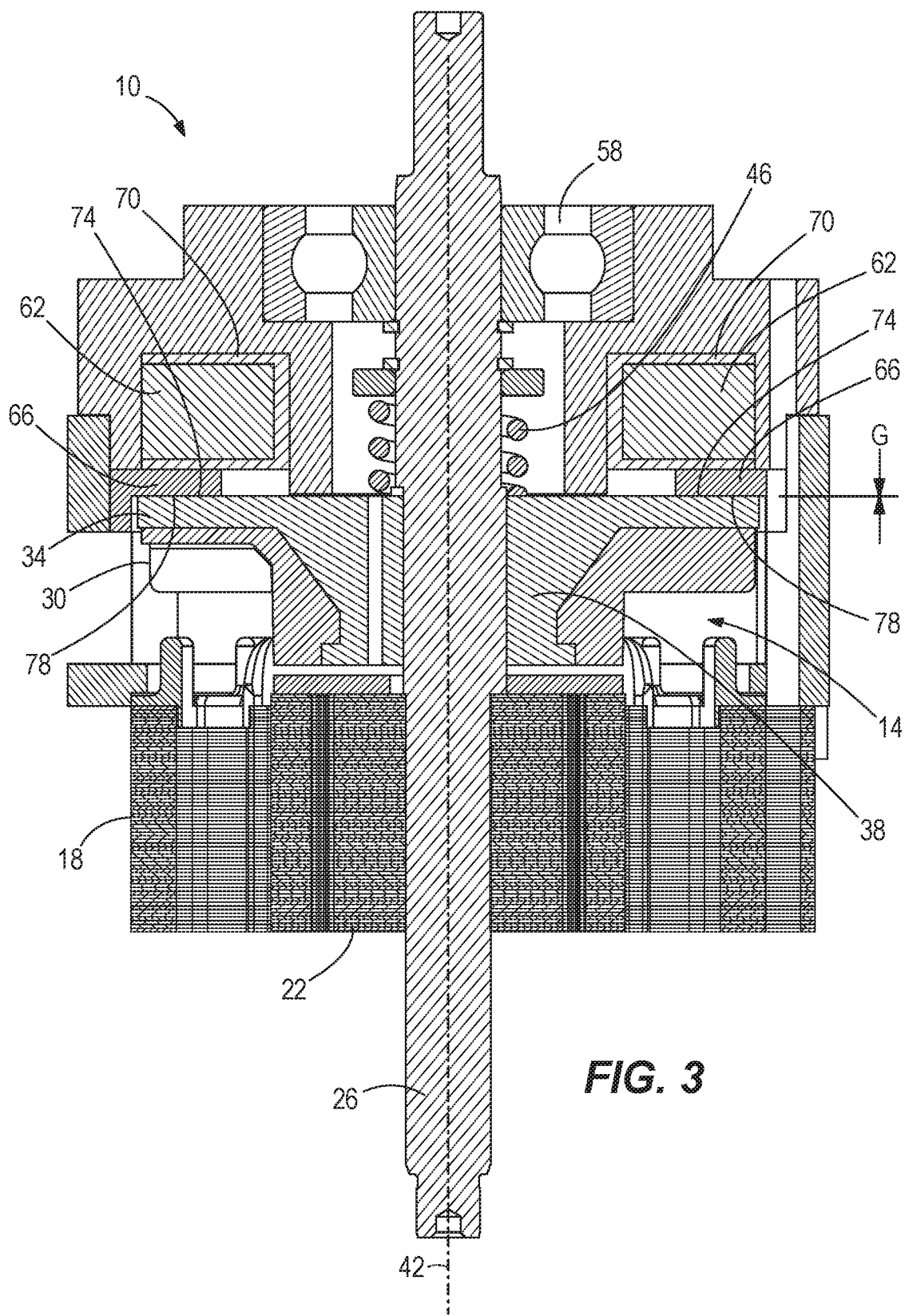
FIG. 3 is another cross-sectional view of the electric motor of FIG. 1 illustrating the first braking member in a braking position.
Figure 4:
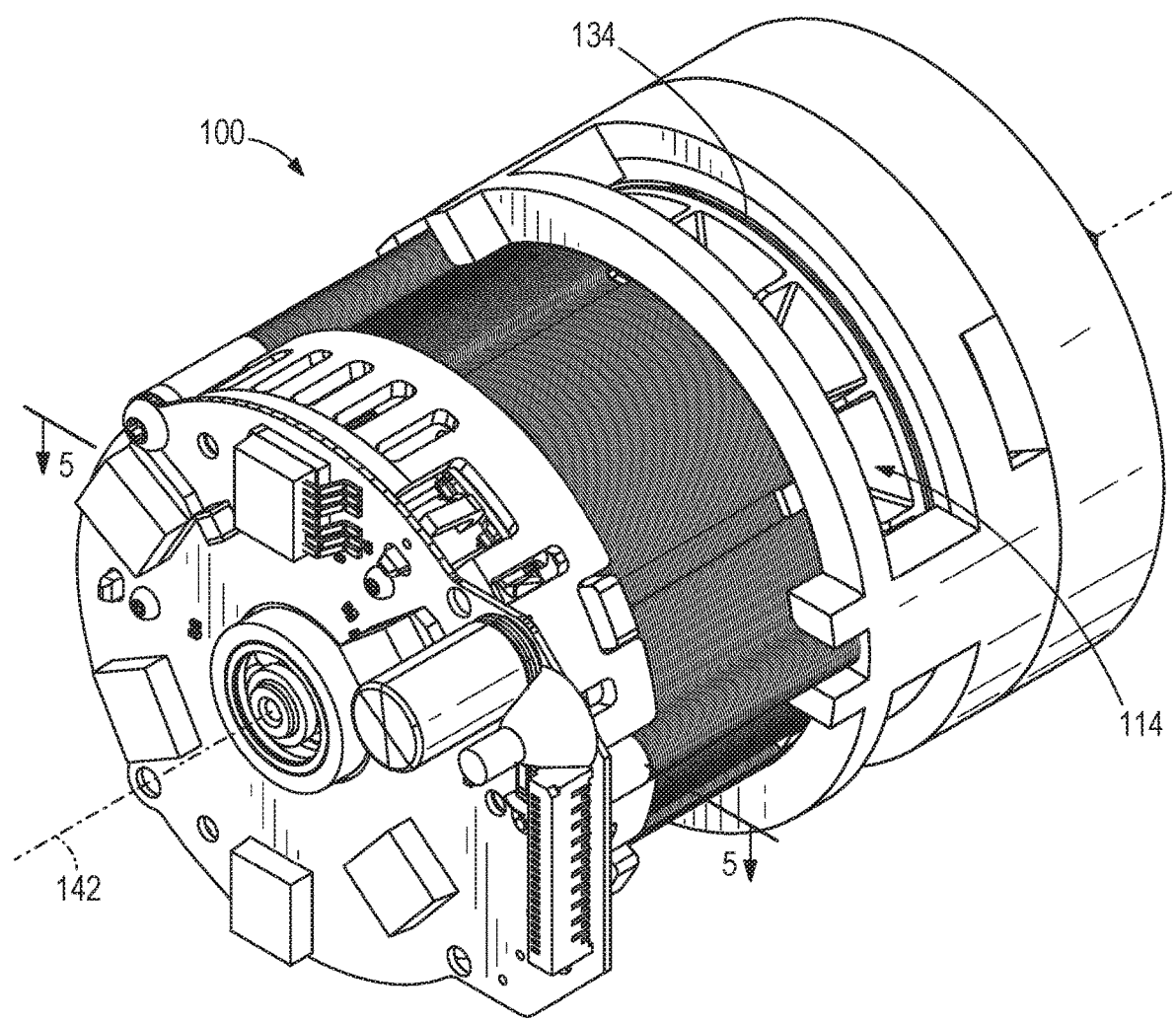
FIG. 4 is a perspective view of another embodiment of an electric motor including a braking mechanism.

With reference to FIGS. 2 and 3, the braking mechanism 14 includes a first braking member coupled for co-rotation with the motor shaft 26, and a rotationally fixed second braking member. In the illustrated embodiment, the first braking member is a braking pad 34 coupled for co-rotation with the motor shaft 26. As will be further described below, the second braking member of the illustrated embodiment is a ring-shaped brake member 66 rotationally fixed relative to the motor shaft 26.

With continued reference to FIGS. 2 and 3, the braking mechanism 14 also includes a fan 30 directly coupled to the braking pad 34. The combined fan 30 and braking pad 34 both share a common bushing or hub 38. By combining the fan 30 with the braking pad 34, the assembled motor 10 and braking mechanism 14 may save space and provide a shorter length thereof. The fan 30 and braking pad 34 are locked together for co-rotation about a motor axis 42 defined by the motor shaft 26. The hub 38 is secured to the motor shaft 26 via a keyed or a spline fit, such that the fan 30, the braking pad 34, and the hub 38 are rotationally fixed to the motor shaft 26, but are axially movable relative thereto. A compression spring 46 biases the fan 30 and the braking pad 34 toward a first or "release" position adjacent the rotor 22.

With continued reference to FIGS. 2 and 3, the braking mechanism 14 also includes an external frame 50 (FIG. 1) having a first side fixedly coupled to the stator 18 via fasteners (e.g., screws; not shown). A second side of the external frame 50 is fixedly coupled to a field cup 54 via the fasteners. A bearing 58 is arranged within the field cup 54 to rotatably support an end or output portion of the motor shaft 26.

The braking mechanism 14 further includes an electromagnet 62 arranged within the field cup 54 and positioned about the motor shaft 26. The second braking member or ring-shaped brake member 66 is coupled to the field cup 54 via the fasteners, and arranged between the electromagnet 62 and the braking pad 34. An insulator 70 surrounds the electromagnet 62 to provide an insulated barrier between the electromagnet 62 and the brake member 66. The braking pad 34 includes a generally flat first braking surface 74, and the brake member 66 includes a corresponding generally flat second braking surface 78 configured to frictionally engage the first braking surface 74 of the braking pad 34. In some embodiments, the first and second braking surfaces 74, 78 are generally perpendicular to the motor axis 42.

As discussed above, the braking pad 34 and the fan 30 are biased toward the first or "release" position adjacent the rotor 22 in which an axial gap G exists between the braking pad 34 and the brake member 66. The braking pad 34 and the fan 30 are axially movable between the first position (FIG. 2) and a second or "braking" position (FIG. 3), in which the gap G is closed and the braking pad 34 is engaged with the brake member 66 for rotational unitization therewith. In the second or "braking" position of the braking pad 34 and the fan 30, the rotationally unitized engagement between the braking pad 34 and the brake member 66 occurs as a result of friction developed between the braking surfaces 74, 78.

In operation, when the electric motor 10 is activated, the braking pad 34 and the fan 30 are biased away from the brake member 66 (and toward the first position) by the spring 46. When a braking condition is detected, a controller (not shown) sends a control signal to brake the motor 10 by energizing the electromagnet 62. The braking pad 34 is made of a ferromagnetic material (e.g., 1018 carbon nitride steel), and when the electromagnet 62 is energized, the braking pad 34 is magnetically drawn toward the electromagnet 62. The magnetic attraction between the braking pad 34 and the electromagnet 62 overcomes the force imparted on the braking pad 34 by the spring 46, so that the combined braking pad 34 and fan 30 slide axially toward the electromagnet 62 to the second position at which the braking pad 34 contacts the brake member 66. In the second position, the braking surfaces 74, 78 of the braking pad 34 and the brake member 66 engage one another to frictionally slow rotation of the braking pad 34 and thus slow the spinning of the motor shaft 26. When the braking condition is no longer detected, the controller terminates the control signal to brake the motor 10, and the electromagnet 62 is de-energized. The spring 46 then rebounds, causes the braking pad 34 and the fan 30 to slide axially along the motor shaft 26 away from the second or "braking" position toward the first or "release" position to open the gap G once again.

In some embodiments, engagement between the braking pad 34 and the brake member 66 in the second or "braking" position causes the motor shaft 26 to fully cease rotation relative to the stator 18. In the same or other embodiments, engagement between the braking pad 34 and the brake member 66 in the second or "braking" position transpires for a predetermined time period such that rotation of the motor shaft 26 is frictionally slowed but not fully stopped relative to the stator 18. In these embodiments, the braking pad 34 may be disengaged from the brake member 66 and moved toward the first or "release" position before the motor shaft 26 fully ceases rotation relative to the stator 18.

In one embodiment, the braking mechanism 14 may be configured to stop the rotation of the rotor 22 in 90 degrees or less of rotation from the time that the controller detects a braking condition and sends the control signal to brake the motor 10. In one embodiment, the braking mechanism 14 may be configured to brake the motor 10 in less than 30 milliseconds from the time that the controller detects a braking condition and sends the control signal to brake the motor 10. In another embodiment, the braking mechanism 14 may be configured to brake the motor 10 in less than 25 milliseconds from the time that the controller detects a braking condition and seconds the control signal to brake the motor 10. In another embodiment, the braking mechanism 14 may be configured to brake the motor 10 in between 20 and 25 milliseconds from the time that the controller detects a braking condition and sends the control signal to brake the motor 10.

FIGS. 4-7 illustrate another embodiment of an electric motor 100 including a braking mechanism 114 similar to the braking mechanism 14 described above, with like features shown with reference numerals plus "100." The braking mechanism 114 is operable to quickly slow and stop the output of the electric motor 10 in a manner similar to that of the braking mechanism 14 described above. Instead of the generally flat first braking surface 74, the braking pad 134 of the braking mechanism 114 includes a frusto-conical first braking surface 182. Likewise, instead of the generally flat second braking surface 78, the brake member 166 of the braking mechanism 114 includes a frusto-conical second braking surface 186.

Figure 6:
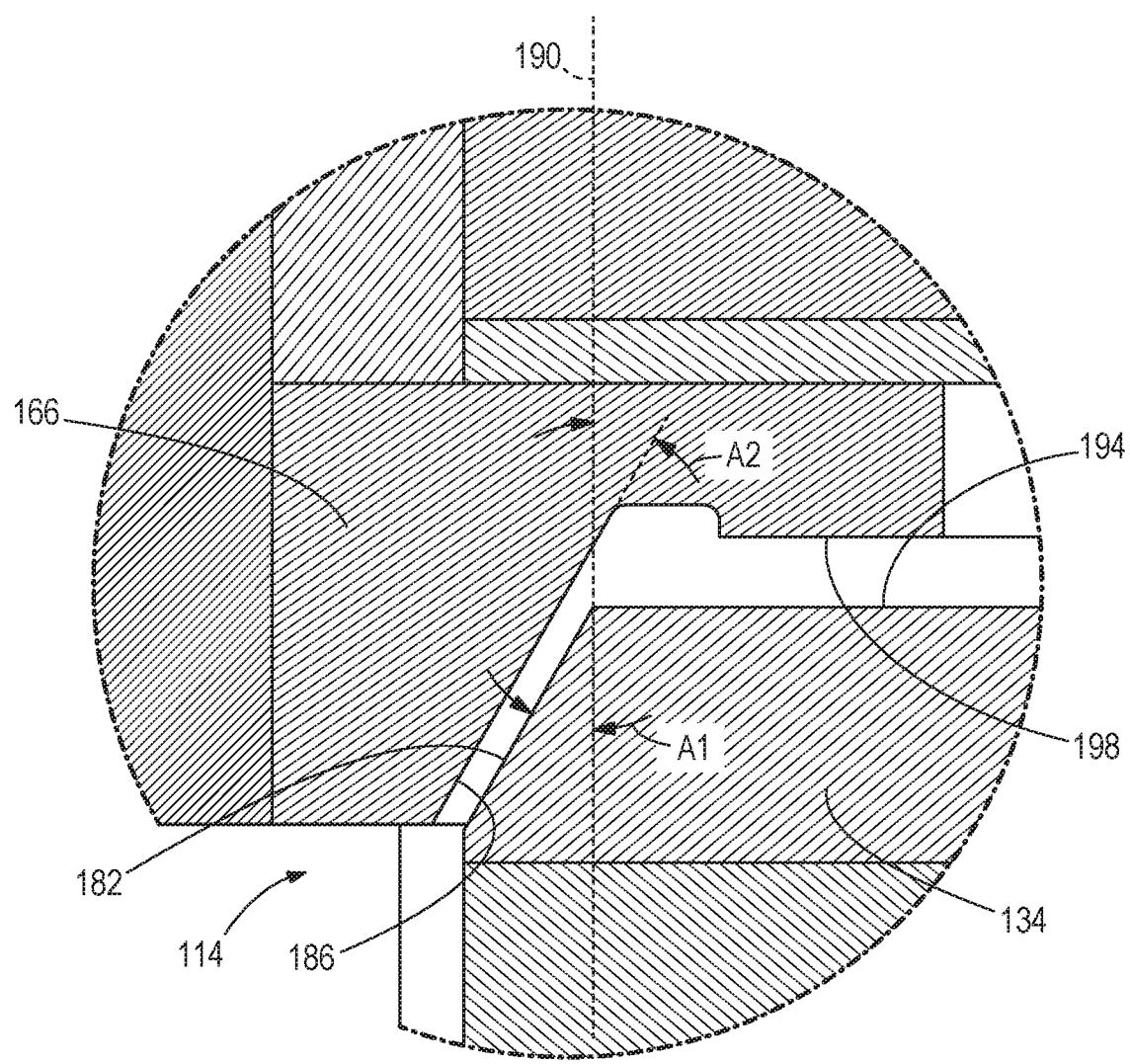
FIG. 6 is an enlarged cross-sectional view of the braking mechanism of FIG. 5.

As shown in FIG. 6, the frusto-conical first braking surface 182 defines an acute first angle A1 with respect to the motor axis 142. For illustration purposes, a reference axis 190 that is parallel to the motor axis 142 has been shown in FIG. 6 to illustrate the first angle A1. In some embodiments, the first angle A1 is less than 90 degrees. In other embodiments, the first angle A1 is between about 45 degrees and about 15 degrees. In some embodiments, the first angle A1 is approximately 30 degrees. The frusto-conical second braking surface 186 likewise defines an acute second angle A2 with respect to the motor axis 42. In some embodiments, the second angle A2 is approximately equal to the first angle A1 such that the conical surfaces of the frustro-conical first and second braking surfaces 182, 186 frictionally engage one another during the braking operation.

By providing the braking mechanism 114 with frusto-conical first and second braking surfaces 182, 186, the braking mechanism 114 of FIGS. 4-7 may impart additional braking torque compared to the braking mechanism 14 having substantially flat first and second braking surfaces 74, 78. For example, when the angles A1 and A2 of the frusto-conical first and second braking surfaces 182, 186 are approximately 30 degrees, the braking mechanism 114 may provide a second braking torque that is double a first braking torque of the braking mechanism 14 having substantially flat braking surfaces 74, 78.

Figure 5:
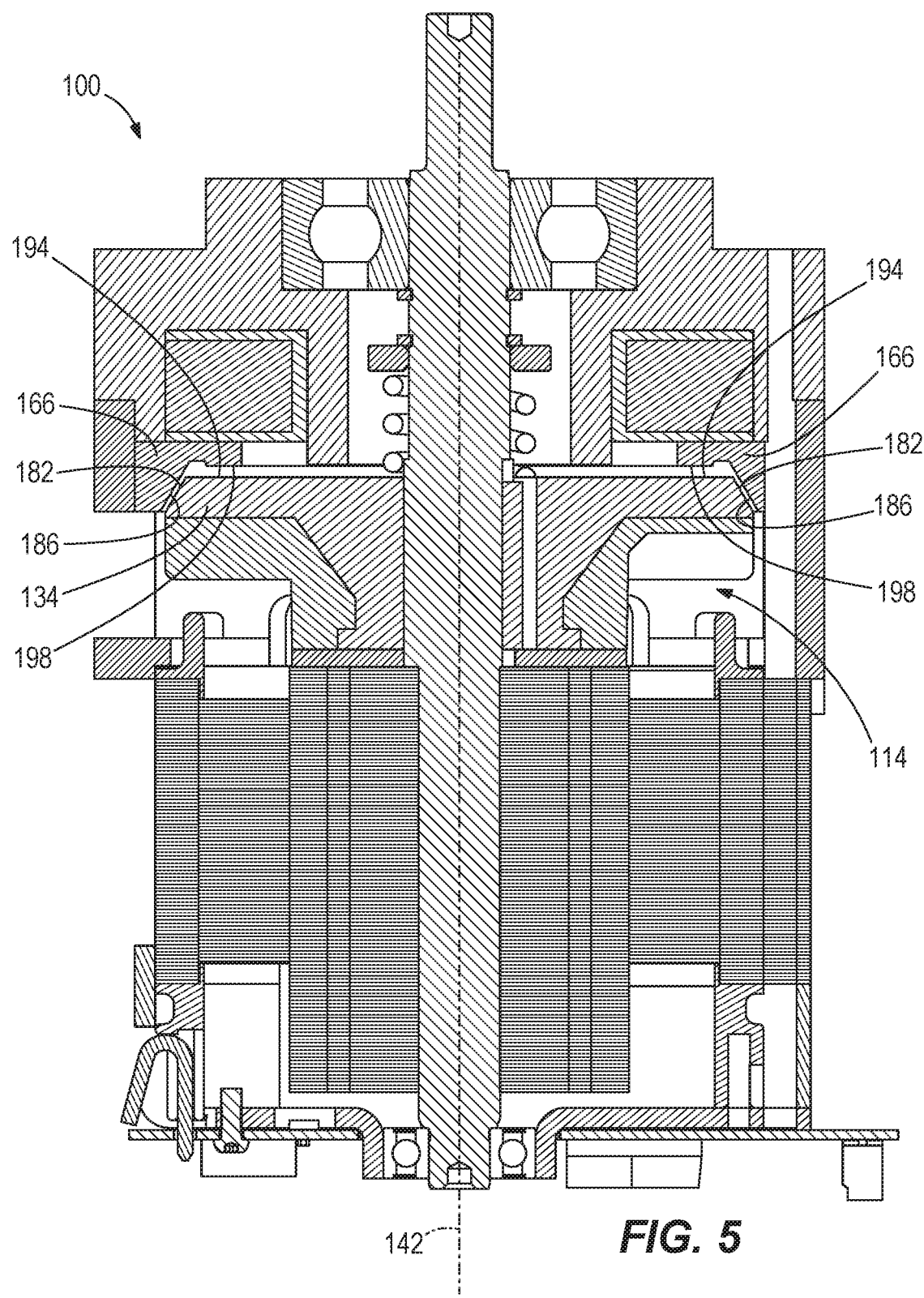
FIG. 5 is a cross-sectional view of the electric motor of FIG. 4 illustrating a first braking member of the braking mechanism in a release position.
Figure 7:
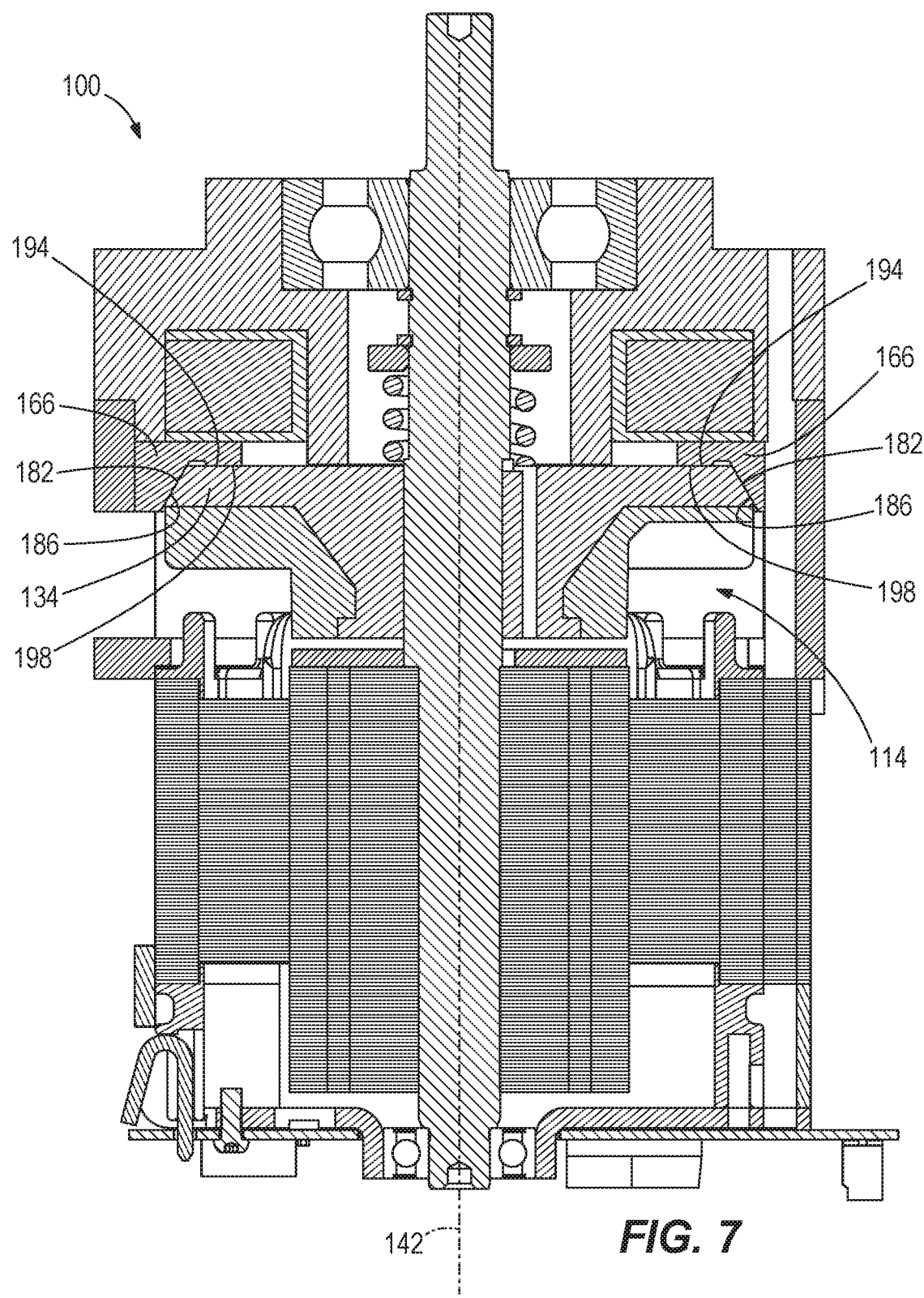
FIG. 7 is another cross-sectional view of the electric motor of FIG. 4 illustrating the first braking member in a release position.

With continued reference to FIGS. 5-7, in some embodiments, in addition to the frusto-conical first braking surface 182, the braking pad 134 optionally may further include a perpendicular first braking surface 194 positioned radially inward relative to the frusto-conical first braking surface 182. Likewise, the brake member 166 may further include a perpendicular second braking surface 198 positioned radially inward relative to the frusto-conical second braking surface 186 and corresponding to the perpendicular first braking surface 194. Each of the perpendicular first and second braking surfaces 194, 198 is generally perpendicular to the motor axis 42. In these embodiments, when the braking pad 134 engages the brake member 166 in the second or "braking" position, engagement between the frusto-conical first and second braking surfaces 182, 186 and engagement between the perpendicular first and second braking surfaces 194, 198 may occur simultaneously as illustrated in FIG. 7.

Various features of the invention are set forth in the following claims.

What is claimed is:

1. A braking mechanism for an electric motor, the braking mechanism comprising:
   an electromagnet configured to be selectively energized in response to a control signal;
   a first braking member coupled for co-rotation with a motor shaft of the electric motor, the first braking member being configured to selectively translate axially relative to the motor shaft between a first position and a second position; and
   a second braking member located between the first braking member and the electromagnet and rotationally fixed relative to the first braking member;
   wherein when the electromagnet is energized, the electromagnet causes the first braking member to translate from the first position to the second position at which the first braking member engages the second braking member to brake the electric motor.

2. The braking mechanism of claim 1, wherein the first braking member is made from a ferromagnetic material.

3. The braking mechanism of claim 1, further including a spring that biases the first braking member toward the first position.

4. The braking mechanism of claim 1, further including a fan coupled for co-rotation with the first braking member.

5. The braking mechanism of claim 1, wherein the first braking member includes a first braking surface, and wherein the second braking member includes a second braking surface that engages the first braking surface when the first braking member is in the second position.

6. The braking mechanism of claim 5, wherein the first braking surface comprises a frusto-conical first braking surface that defines an acute angle relative to a motor axis defined by the motor shaft, and wherein the second braking surface comprises a frusto-conical second braking surface.

7. A braking mechanism for an electric motor, the braking mechanism comprising:
   a first braking member coupled for co-rotation with a motor shaft of the electric motor, the first braking member being configured to selectively translate axially relative to the motor between a first position and a second position;
   a fan coupled for co-rotation with the first braking member, the fan being configured to selectively translate axially together with the first braking member and relative to the motor shaft; and
   a second braking member rotationally fixed relative to the first braking member and to the fan;
   wherein the first braking member does not engage the second braking member in the first position, and the first braking member engages the second braking member in the second position to brake the electric motor.

8. The braking mechanism of claim 7, wherein the first braking member is made from a ferromagnetic material.

9. The braking mechanism of claim 7, further including a spring that biases the first braking member toward the first position.

10. The braking mechanism of claim 7, further including an electromagnet configured to be selectively energized in response to a control signal.

11. The braking mechanism of claim 7, wherein the first braking member includes a first braking surface, and wherein the second braking member includes a second braking surface that engages the first braking surface when the first braking member is in the second position.

12. The braking mechanism of claim 11, wherein the first braking surface comprises a frusto-conical first braking surface that defines an acute angle relative to a motor axis defined by the motor shaft, and wherein the second braking surface comprises a frusto-conical second braking surface.

13. A braking mechanism for an electric motor, the braking mechanism comprising:
   a first braking member coupled for co-rotation with a motor shaft of the electric motor, the first braking member including a frusto-conical first braking surface that defines an acute angle relative to a motor axis defined by the motor shaft; and
   a second braking member rotationally fixed relative to the first braking member, the second braking member including a frusto-conical second braking surface;
   wherein the frusto-conical first braking surface selectively engages the frusto-conical second braking surface to brake the electric motor.

14. The braking mechanism of claim 13, wherein the acute angle is between 15 degrees and 45 degrees.

15. The braking mechanism of claim 14, wherein the acute angle is 30 degrees.

16. The braking mechanism of claim 13, wherein the first braking member further includes a perpendicular first braking surface disposed radially inward from the frusto-conical first braking surface and oriented perpendicular to the motor axis, and wherein the second braking member further includes a perpendicular second braking surface disposed radially inward from the frusto-conical second braking surface and oriented perpendicular to the motor axis.

17. The braking mechanism of claim 13, further including a fan coupled for co-rotation with the first braking member.

18. The braking mechanism of claim 17, wherein the fan is configured to selectively translate axially together with the first braking member and relative to the motor shaft.

19. The braking mechanism of claim 13, further including an electromagnet configured to be selectively energized in response to a control signal.

20. The braking mechanism of claim 13, wherein the first braking member is made from a ferromagnetic material.

\* \* \* \* \*